United States Patent [19]
Hambock et al.

[11] 3,917,630
[45] Nov. 4, 1975

[54] HETEROCYCLIC COMPOUNDS

[75] Inventors: Heinz Hambock, Binningen; Elmar Sturm, Arlesheim; Anton Georg Weiss, Benken, Basel-Land, all of Switzerland

[73] Assignee: Ciba-Geigy Corporation, Ardsley, N.Y.

[22] Filed: Aug. 28, 1972

[21] Appl. No.: 284,199

[30] Foreign Application Priority Data
Aug. 31, 1971 Switzerland.................. 12795/71

[52] U.S. Cl............................ 260/302 SD; 424/270
[51] Int. Cl............................................. C07d 91/60
[58] Field of Search............................ 260/302 SD

[56] References Cited
UNITED STATES PATENTS

| | | | |
|---|---|---|---|
| 2,358,031 | 9/1944 | Roblin et al. | 260/306.8 D |
| 3,260,725 | 7/1966 | Schroeder | 260/306.8 D |
| 3,692,794 | 9/1972 | Rosen et al. | 260/302 SD |
| 3,736,328 | 5/1973 | Wittenbrook et al. | 260/302 SD |
| 3,770,749 | 11/1973 | Phillips | 260/302 SD |

FOREIGN PATENTS OR APPLICATIONS

| | | | |
|---|---|---|---|
| 2,142,913 | 3/1972 | Germany | 260/302 SD |
| 17,998 | 11/1962 | Japan | 260/302 SD |

OTHER PUBLICATIONS
Wagner et al., Synthetic Organic Chemistry, N.Y., John Water & Sons, 1953, pp. 801–802.

*Primary Examiner*—Richard J. Gallagher
*Attorney, Agent, or Firm*—Harry Falber; Frederick H. Rabin; Karl F. Jorda

[57] ABSTRACT

Thiadiazole derivatives of formula I

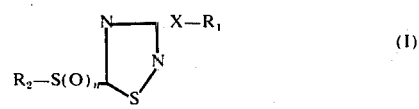

wherein $R_1$ represents a phenyl or benzyl radical, unsubstituted, or mono- to trisubstituted by halogen, trifluoromethyl, nitro, or alkyl having 1–4 carbon atoms, X represents oxygen, sulphur, or a direct bond, $R_2$ represents an alkyl radical having 1–4 carbon atoms, unsubstituted, or mono- to disubstituted by halogen, and n represents 1 or 2, useful as antimicrobial substance.

3 Claims, No Drawings

HETEROCYCLIC COMPOUNDS

The present invention relates to new thiadiazole derivatives, to processes for their production, to agents containing the new substances, as well as to the use thereof.

The new thiadiazole derivatives correspond to formula I

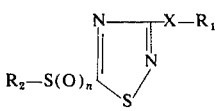

wherein $R_1$ represents a phenyl or benzyl radical, unsubstituted, or mono- to trisubstituted by halogen, trifluoromethyl, nitro, or alkyl having 1–4 carbon atoms, X represents oxygen, sulphur, or a direct bond, $R_2$ represents an alkyl radical having 1–4 carbon atoms, unsubstituted, or mono- to disubstituted by halogen, and n represents 1 or 2.

The alkyl group having 1–4 carbon atoms which occurs in the above formula as $R_2$ and as substituent on $R_1$ can be straight chain or branched.

For the purposes according to the invention, compounds of formula I are preferred wherein $R_1$ represents a phenyl or benzyl radical optionally ring-substituted by a halogen atom, preferably a chlorine atom, X represents sulphur or a direct bond, $R_2$ represents alkyl having 1 to 4 carbon atoms, preferably methyl or ethyl, and n represents 1 or 2.

New thiadiazole derivatives of formula I wherein n represents 2 are produced according to the invention by a process in which a 5-chlorothiadiazole of formula II

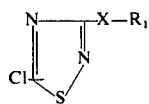

wherein $R_1$ and X have the meanings given under formula I is reacted with a compound of formula III $$R_2—S(O)_n—Me$$ <span style="float:right">III</span> wherein $R_2$ has the meaning given under formula I, n denotes 2, and Me represents an alkali metal cation.

The reaction is preferably performed in an organic solvent inert to the reactants. Such suitable solvents are, e.g.: alcohols such as methanol, ethanol, ethers such as tetrahydrofuran or dioxane, also N,N-dimethylformamide and dimethylsulphoxide. Particularly suitable solvents are polyvalent, partially etherified alcohols such as methylcellosolve or glycol monomethyl ether. The reaction temperatures are between 0° and the reflux temperature of the reaction mixture, preferably between 80° and 100°C.

Thiadiazole derivatives of formula I wherein n denotes 1 or 2 are produced according to the invention by the oxidation of a thiadiazole derivative of formula IV

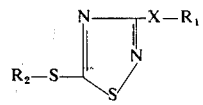

wherein $R_1$, X and $R_2$ have the meanings given under formula I.

This oxidation can be performed, in a manner known per se, with peroxy acids, e.g. peroxyacetic acid or peroxybenzoic acid, also with hydrogen peroxide or potassium permanganate. The reaction is carried out in an organic solvent. Suitable solvents for this purpose are preferably chlorinated hydrocarbons, e.g. methylene chloride, chloroform, carbon tetrachloride or chlorobenzene.

The 5-chlorothiadiazoles of formula II which are required as starting materials can be obtained by reaction of compounds of formula V

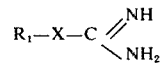

wherein $R_1$ and X have the meanings given under formula I with perchloromethylmercaptan (trichloromethanesulphenic acid chloride) in the presence of an acid-binding agent, e.g. alkali hydroxide, in an inert solvent such as, e.g. methylene chloride, chloroform, benzene or toluene. (cp. J. Goerdeler et al. Chem.Ber. 90, 182, 1957, ibid. 90, 892, 1957).

Compounds of formula V wherein X represents a direct bond are obtained, e.g. by reaction of nitriles with ammonia in the presence of hydrogen chloride. (cp. Pinner, 'Die Iminoather' (The imino ethers), Verlag Oppenheim, Berlin, 1892).

Compounds of formula V wherein X represents oxygen or sulphur are obtained, for example, if alcohols or thiols derived from $R_1$ according to the above definition are reacted in ether, and in the presence of hydrogen chloride, with cyanamide (unstabilised). Compounds of formula IV wherein X represents sulphur can moreover be produced by the reaction of halides derived from $R_1$ with thiourea to give the corresponding isothiuronium salts.

The mentioned reaction of compounds of formula V with perchloromethylmercaptan is advantageously performed by a process in which a compound of formula V is placed into one of the above stated solvents, an addition made of perchloromethylmercaptan, and then, at 0°C, of the amount of aqueous alkali hydroxide necessary for the binding of the formed hydrochloric acid. Depending on whether the compound of formula V is used in the free form or in the form of its hydrochloride, the amount of alkali hydroxide added is 3 or 4 moles per mole of compound V.

The processing of the reaction mixture can be effected by separation of the organic phase, removal by evaporation of the solvent, and recrystallisation or distillation of the residue.

The compounds of formula I are colourless substances which are obtained in some cases in crystalline form, and in some cases in the form of oily liquids. The production of the compounds of formula I is further illustrated by the following examples:

Example 1

3-Phenylthio-5-methylsulphonyl-1,2,4-thiadiazole

An amount of 23 g of 3-phenylthio-5-chloro-1,2,4-thiadiazole is dissolved in 100 ml of methylcellosolve in a 350 ml reaction flask fitted with stirrer and internal thermometer. An addition is made, with stirring, of 10.5 g of Na-methylsulphinate (0.1 mole), and the reaction mixture heated for 1 hour at 100°C. The mixture is afterwards poured into 500 ml of distilled water, and the precipitated colourless product filtered off. Recrystallisation from methanol yields 12 g of 3-phenylthio-5-methylsulphonyl-1,2,4-thiadiazole, M.P. 145°–150°C (45% of theory). Analysis for $C_9H_8N_2O_2S_3$ (MG 272.3) calculated: C, 39.7; H, 2.9; N, 10.3 found: 39.7 2.9 10.3.

The 3-phenylthio-5-chloro-1,2,4-thiadiazole employed as starting product is produced as follows:

An amount of 160 g (1 mole) of S-phenyl-isothiourea (ARNDT, Ann. 384, 322 [1911]) is dissolved in 1 litre of methylene chloride in a 2.5 litre sulphating flask fitted with stirrer, dropping funnel, internal thermometer, and protective device against smell. This solution is cooled to −10°C, and 185 g (1 mole) of perchloromethylmercaptan then stirred in. An addition is made dropwise, with further stirring, of a solution of 120 g (3 moles) of NaOH in 600 ml of water, the temperature in the reaction mixture not being allowed during the addition to exceed 0°C.

The organic layer is thereupon separated, dried with $MgSO_4$, and the solvent evaporated off. Recrystallised from methanol/ethyl acetate 3:1, the residue yields 75 g of 3-phenylthio-5-chloro-1,2,4-thiadiazole in the form of slightly yellowish crystals, M.P. 55°–57°C (33% of theory).

Example 2

3-(4'-Chlorophenyl)-5-ethylsulphonyl-1,2,4-thiadiazole

An amount of 15.5 g (0.06 mole) of the substance as previously synthetised in Example 1 is dissolved in 150 ml of glacial acetic acid. An addition is then made dropwise at 40°–50°C, in a 750 ml sulphating flask provided with stirrer, dropping funnel and internal thermometer, of 17.6 g of peroxyacetic acid (52%, 0.12 mole) in 100 ml of glacial acetic acid. When the reaction mixture no longer discolours potassium iodide starch paper, it is diluted with 500 ml of water. The precipitated product is filtered off under suction and then recrystallised from methanol. There is obtained 13 g of colourless crystals (75% of theory), M.P. 109°–110°C. Analysis for $C_{10}H_9ClN_2O_2S_2$ (MG 288.8) calculated: C, 41.5; H, 3.1; Cl, 12.3 found: 41.6; 3.2; 12.3.

The following compounds are obtained by the procedures described in Examples 1–2:

| Compound | Melting point |
| --- | --- |
| 3-(4'-chlorophenyl)-5-methylsulphonyl-1,2,4-thiadiazole | 115–117°C |
| 3-(4'-chlorophenyl)-5-methylsulphinyl-1,2,4-thiadiazole | 140–142°C |
| 3-(4'-chlorophenyl)-5-ethylsulphinyl-1,2,4-thiadiazole | 108–110°C |
| 3-(4'-chlorobenzyl)-5-methylsulphonyl-1,2,4-thiadiazole | 105–106°C |
| 3-benzylthio-5-methylsulphonyl-1,2,4-thiadiazole | 108°C |
| 3-benzyl-5-methylsulphonyl-1,2,4-thiadiazole | 100–101°C |
| 3-(4'-chlorophenyl)-5-ethylsulphonyl-1,2,4-thiadiazole | 109–110°C |
| 3-(4'-chlorophenylthio)-5-methylsulphonyl-1,2,4-thiadiazole | 105–107°C |

The thiadiazole derivatives of formula I possess excellent bactericidal and fungicidal properties, as is shown by the following tests:

A. Action against Botrytis einera on Vicia faba (broad beans)

Three well-developed, like-sized leaves of Vicia faba are placed into each Petri dish lined with moist filter paper, the leaves being sprayed dripping wet with a liquor (0.1% content of active substance) prepared from the active substance in the form of a wettable powder. After drying of the applied coating, the leaves are infested with a freshly prepared sport suspension of the fungus. After the leaves have been kept for 1–2 days in a moist atmosphere at 18°–20°C, black, initially point-like spots appear, which rapidly spread. The number and size of the points of infestation serve as a criterion for evaluation of the degree of effectiveness of the test substance.

The substances of formula I exhibit a very good action, especially 5-methylsulphonyl-3-(p-chlorophenyl)-1,2,4-thiadiazole, 5-methylsulphinyl-3-(p-chlorophenyl)-1,2,4-thiadiazole, and 5-methylsulphonyl-3-(p-chlorobenzyl)-1,2,4-thiadiazole.

B. Action against Phytophthora infestans (potato and tomato blight) on tomatoes (Solanum Lycopersicum)

Tomatoes of the same variety and in the same stage of development, in the dry state after being previously sprayed with a liquor of 0.1% of active substance (produced from the active substance in the form of a wettable powder), are sprayed dripping wet with a zoospore suspension of Phytophthora infestans. The tomatoes then remain for about 6 days in a green-house at 18°–20° with high relative humidity (95–100%); they exhibit after this period of time typical leaf-spots. An evaluation is made of the tested substances on the basis of the number and size of the leaf-spots.

Among the tested substances of the general formula I, 5-methylsulphonyl-3-phenylthio-1,2,4-thiadiazole is shown to be particularly effective.

C. Action on Uromyces appendiculates (bean rust) on beans (Phaseolus vulgaris)

Bean plants in the two-leaf stage are sprayed dripping wet with a suspension of the substances made up as wettable powders (conc. 0.1% of active substance). After the drying of the applied coating, the plants are infested with a fresh spore suspension of bean rust (5 plants per product), and then kept for 1 day in a moist chamber, and afterwards in a green-house at 20°–22°C. The evaluation of the test results is made on the basis of the number of rust spots present on the plants after about 8–12 days.

Of the substances of formula I tested, the following, in particular, exhibit an excellent action: 5-ethylsulphinyl-3-(p-chlorophenyl)-1,2,4-thiadiazole, 5-ethylsulphonyl-3-(p-chlorophenyl)-1,2,4-thiadiazole, and 5-methylsulphonyl-3-benzylthio-1,2,4-thiadiazole.

D. Dish test

The solution of the active substance is mixed with the still hot nutrient-agar, and poured into dishes. After solidification, the test germs are applied, and incubated for 48 hours at 37°C. It is possible by a variation of the added amount of active substance to determine the minimum concentration to effect inhibition of growth.

I. Bacteria

The following strains of bacteria were examined:
Staphylococcus aureus
Escherichia coli
Staphylococcus faecalis
Brevibacterium ammoniagenes
Sareina ureae
Proteus vulgaris
Bacillus subtilis
Salmonella pullorum
Mycobacterium phtei
Corynebacterium diphteroides The compounds of formula I have a very good action; particularly 5-methylsulphonyl-3-(p-chlorophenyl)-1,2,4-thiadiazole and 5-methylsulphonyl-3-(p-chlorobenzyl)-1,2,4-thiadiazole.

II. Fungi

The following strains were examined:
Epidermophyton floceosum
Trichophyton gypseum
Candida albicans
Saccharomyces cereversiae
Fusarium oxysporum
Torula utilis
Aspergillus flavus
Penicillium expansum
Aspergillus niger
Pullularia pullulans
Coniophora cerebella
Poria vaporaria
Lenzites abietina
Polystictus versicolor
Fomes annosus
Alternaria tenuis The compounds of formula I exhibit a very good action, particularly the following: 5-methylsulphinyl-3-(p-chlorophenyl)-1,2,4-thiadiazole, 5-ethylsulphinyl-3-(p-chlorophenyl)-1,2,4-thiadiazole, 5-ethylsulphonyl-3-(p-chlorophenyl)-1,2,4-thiadiazole, and 5-methylsulphonyl-3-phenylthio-1,2,4-thiadiazole.

E. Inhibition-zone test

Method

The active substances are applied, in the exhaust or pad dyeing process, from solutions having varying contents of active substance to textile or paper rondelles. The solvent used is ethylene glycol monomethyl ether. Plates known as two-layer plates are employed as nutrient agar. These consist of one layer of bacto agar and one layer of the agar suitable for the corresponding test organisms. This second layer is inoculated beforehand with the test germs. The rondelles treated with the active substance are then placed on to these plates and incubated for 24 hours at 37°. The growth of the test organisms on and under the rondelles is subsequently evaluated.

The following test organisms were used:

| Bacteria: | Staphylococcus aureus SG 511 | (nutrient agar + potassium tellurite) |
|---|---|---|
| | Escherichia coli | (nutrient agar) |
| Fungi: | Aspergillus niger | (wort agar) |
| | Candida albicans | (wort agar) |

A very good action is exhibited, in particular, by the following compounds: 5-methylsulphonyl-3-(p-chlorophenyl)-1,2,4-thiadiazole, 5-ethylsulphonyl-3-(p-chlorophenyl)-1,2,4-thiadiazole, and 5-methylsulphonyl-3-(p-chlorobenzyl)-1,2,4-thiadiazole.

F. Disinfection test

The active substances are applied in the exhaust process (foulard) from solutions containing varying amounts of active substance to textile or paper rondelles. These specimens are then inoculated with suspensions (physiological saline solution having a 10% bouillon content) of the various test organisms. The rondelles are then incubated in a moist chamber for 24 hours at 37°C, and then washed out in 20 cm³ of physiological saline solution (containing for the blocking of the active substance polyoxyethylene-sorbitol-monooleate). Aliquot parts of this solution are taken and spread out on to suitable nutrient media. The nutrient media are then incubated for 24 hours at 37°C. The test organisms employed were those mentioned under 2. The number of living germs compared with the number on the control specimen is subsequently determined.

The following were used as test organisms:
Staphylococcus aureus
Escherichia coli
Aspergillus niger ATCC
Candida albicans A very good action is exhibited, in particular, by the following compounds: 5-methylsulphonyl-3-(p-chlorophenyl)-1,2,4-thiadiazole, 5-ethylsulphonyl-3-(p-chlorophenyl)-1,2,4-thiadiazole, and 5-methylsulphonyl-3-(p-chlorobenzyl)-1,2,4-thiadiazole.

G. Mould test

Paper rondelles to which have been applied in the pad dyeing process the active substance solution are placed on to a sterile beer-wort agar plate, and inoculated with a germ suspension of the test organisms. The paper rondelles are then incubated for 3 days at 28°C with 75–85% relative humidity. An evaluation is subsequently made of the occurred growth on and under the specimens.

The following are used as test organisms:
Penicillium expansum
Aspergillus niger
Alternaria tenuis A very good action is exhibited, in particular, by the following compounds: 5-methylsulphonyl-3-(p-chlorophenyl)-1,2,4-thiadiazole, 5-ethylsulphonyl-3-(p-chlorophenyl)-1,2,4-thiadiazole, and 5-methylsulphonyl-3-(p-chlorobenzyl)-1,2,4-thiadiazole.

H. Microbicidal activity in paints

Method

$x$ Parts of active substance are firstly dissolved in 5 parts of a 1:1 mixture of dimethylformamide and ethylene glycol monomethyl ether, and the solution homogeneously stirred with $(90-x)$ parts of a commercial dispersion paint having a base of polyvinylacetate-ethylacrylate-copolymer and 5 parts of water to form a brushable paint. A coat of this is then applied to filter paper, e.g. Whatmann 3 MM, and the applied coat allowed to dry for 3 days at room temperature. The specimens are subsequently exposed to the air for 8 days in an air duct at 65° with 80–90% relative humidity. The specimens are then cut up and placed on to inoculated agar plates. (fungi coating facing upwards, bacteria coating downwards) The following were used as test organisms:

| Fungi: | Pullularia pullulans<br>Paecilomyces varioti<br>Penicillium cyclopium<br>Aspergillus oryzae<br>Chaetomium globosum<br>Aspergillus niger<br>Candida albicans | Sabouraud-maltose-agar |
|---|---|---|
| Bacteria: | Staphylococcus aureus<br>Escherichia coli | nutrient agar |

The plates are then incubated:
Fungi: 7 days at 28° with 70–80% relative humidity;
Bacteria: 24 hours at 37° with 60% relative humidity.

Of the examined substances of formula I, the following compounds, in particular, exhibit an excellent action:

5-methylsulphonyl-3-(p-chlorophenyl)-1,2,4-thiadiazole, and 5-methylsulphonyl-3-phenylthio-1,2,4-thiadiazole.

I. Dry rot

Samples of various types of wood are dried for 16 to 20 hours at 105° for determination of the dry weight. The specimens are then impregnated, with application of a vacuum, with acetone active substance solutions of varying concentration. The amount of absorbed active substance is determined by re-weighing the specimens.

Furthermore, powder bottles are half filled with quartz sand and 15 cm$^3$ of a nutrient solution: glucose, peptone dissolved in a phosphate buffer, malt extract. A piece of wood of a type suitable for the growth of the fungus (feeder-block) is inserted into the quartz sand, inoculated with the fungus culture, and pre-incubated for a period of 3 weeks.

The samples of wood impregnated with the active substance are placed on to the obtained even furry coatings of fungi. This arrangement is maintained for 2 months at 24°C. The fungus growth and the quality of the wood are then assessed. The specimens are subsequently exposed to fresh air for 4 weeks in an air duct at 65°, and a further assessment of fungus growth made.

The following were used as test organisms and types of wood:

| Coniophora cerebella | on pine | (Pinus silvestris) |
| Coriulus versicolor | on beech | (Fagus silvatica) |
| Poria incarnata | on linden | (Tilia spec.) |

K. Plastics

PVC-Sheets having a preserving and sterilising action are produced by a process in which 0.5 g of the active substance is dissolved in 5 g of methylcellosolve, and the solution then mixed with 55.0 g of PVC-paste (in 5 g of ligroin); the mixture is homogenised and pressed out on a plate at 180°C to form sheets. The composition of the PVC-paste is as follows:

73 parts by weight of PVC GEON 120 × 203
2 parts by weight of dibutyl tin dilaurate
15 parts by weight of dibutyl sebacate
10 parts by weight of dioctylphthalate
10 parts by weight of ligroin, boiling range 80°–110°C
100 parts by weight of PVC-paste These sheets are then tested in 3 ways for determination of their microbicidal and fungistatic action:

Test 1

Complete agar culture media having $10^6$ microorganisms per cm$^3$ of agar are prepared in a dish; round samples of the sheet material are placed on to the nutrient substrate, and the dish incubated at 37°C for 24 hours. A substance is assessed as being effective when no further growth of organisms under the round sample of sheet occurs.

Test 2

The biocidal action is confirmed by a test in which a suspension having ca. $10^6$ microorganisms is maintained in contact, on a carrier, e.g. paper, with a plastic disk for 6 hours at 37°C. The whole is afterwards thoroughly washed in a physiological saline solution, and a bouillon culture then inoculated with one equivalent of this solution. If the substance being tested is active, there is no longer any germ capable of propagation.

Test 3

The plastics-preserving action of the products is confirmed by a test in which an agar is offered without a carbon source to ca. $10^5$ of the microorganisms to be examined, and specimens of the PVC-sheet added. After 14 days at 26°–28°C, the loss in weight of dibutyl sebacate and the physical constants of the PVC-sheet, modified by the loss of softening agent, are determined. In the case of positively effective active substances, the loss in weight remains smaller than 10% of the original amount of dibutyl sebacate.

| Examined organisms | |
|---|---|
| Test 1 | Staphylococcus aureus SG 511 |
| Test 2 | Escherichia coli 8196<br>Candida albicans 22<br>Aspergillus niger ATCC 6275<br>Salmonella pullorum VBIZ 23 |
| Test 3 | Aspergillus niger ATCC 6275<br>Penicillium funiculosum<br>Paec. varioli<br>Trich. viride<br>Chaet. phobosum |

Of the examined substances of formula I, 3-phenylthio-5-methylsulphonyl-1,2,4-thiadiazole exhibits a particularly good action.

The thiadiazole derivatives of formula I can be used as leaf fungicides. Moreover, compounds of formula I wherein $n$ denotes 1 or 2 can serve to protect organic materials, such as wood, paper, textiles, paints and plastics, against infestation by harmful microorganisms; they can be employed, in particular, for the disinfection and preservation of these materials.

For disinfection and preservation purposes, the compounds of formula I can also be used in combination with known antimicrobial agents. These include, e.g.:

*Halogens and halogen compounds with active halogen* e.g. sodium hypochlorite, calcium hypochlorite, chloride of lime, sodium-p-toluenesulphochloramide, p-toluenesulphodichloramide, N-chlorosuccinimide, 1,3-dichloro-5,5-dimethyl-hydantoin, trichloroisocyanuric acid, potassium dichloroisocyanurate, iodine, iodotrichloride, complex compounds of iodine and iodotrichloride with surface-active agents such as polyvinylpyrrolidone, alkylphenoxypolyglycols, polyoxypropylene glycols, alkylaminoethanesulphonic acids and —sulphonates, alkylarylsulphonates, and quaternary ammonium compounds.

Boron compounds e.g. boric acid and borax.

Metal-organic compounds e.g. bis-tributyltin oxide, triphenyltin hydroxide, tributyltin salycylate, tributyltin chloride, phenylmercury borate, phenylmercury acetate.

Alcohols e.g. hexyl alcohol, trichloroisobutyl alcohol, 1,2-propylene glycol, triethylene glycol, benzyl alcohol, 4-chlorobenzyl alcohol, 2,4- and 3,4-dichlorobenzyl alcohol, 2-phenylethyl alcohol, 2-(4-chlorophenyl)-ethyl alcohol, ethylene glycol monophenyl ether, menthol, linalool, and 2-bromo-2-nitropropanediol-1,3.

Aldehydes e.g. formaldehyde, paraformaldehyde, glutaraldehyde, benzaldehyde, 4-chlorobenzaldehyde, 2,4- and 3,4-dichlorobenzaldehyde, cinnamic aldehyde, salicylic aldehyde, 3,5-dibromosalicylic aldehyde, 4-hydroxybenzaldehyde, anisaldehyde, and vanillin.

Carboxylic acids and derivatives e.g. trichloroacetic acid, monobromoacetic acid glycol ester, Na- and Ca-propionat, caprylic acid, undecylenic acid, Zn-undecylenate, sorbic acid, K- and Ca-sorbate, lactic acid, malonic acid, aconitic acid, citric acid, benzoic acid, 4-chlorobenzoic acid, benzoic acid benzyl ester, salicylic acid, 4-chlorosalicylic acid-n-butylamide, salicylanilide, 2,4',5-tribromosalicylanilide, 3,3',4',5-tetrachlorosalicylanilide, 4-hydroxybenzoic acid, 4-hydroxybenzoic acid ethyl ester, gallic acid, madelic acid, phenylpropiolic acid, phenoxyacetic acid, dehydracetic acid, vanillic acid propyl ester.

Phenols e.g. phenol, mono- and polychlorophenols, cresols, 4-chloro-3-methylphenol, 4-chloro-3,5-dimethylphenol, thymol, 4-chlorothymol, 4-t-amylphenol, saligenin, 4-n-hexylresorcin, carvacrol, 2-phenylphenol, 2-benzyl-4-chlorophenol, 2,2'-dihydroxy-5,5'-dichlorodiphenylmethane, 2,2'-dihydroxy-3,3',5,5',6,6'-hexachlorodiphenylmethane, 2,2'-dihydroxy-5,5'-dichlorodiphenylsulphide, 2,2'-dihydroxy-3,3',5,5'-tetrachlorodiphenylsulphide, 2-hydroxy-2',4,4'-trichlorodiphenyl ether, and dibromosalicyl.

Quinones e.g. 2,5-dimethylquinone, 2,3,5,6-tetrachlorobenzoquinone, 2,3-dichloro-1,4-naphthoquinone.

Carbonic acid derivatives e.g. pyrocarbonic acid diethyl ester, tetramethylthiuramdisulphide, 3,4,4'-trichloro-N,N'-diphenylurea, 3-trifluoromethyl-4,4'-dichloro-N,N'-diphenylurea, N-3-trifluoromethylphenyl-N'-2-ethylhexylurea, 1,6-bis-(4'-chlorophenyl-diguanidino)-hexane, dodecylmethyl-guanidine acetate, ammonium rhodanide, 4,4'-diamidino-α,ω-diphenoxy-hexane.

Amines e.g. dodecylpropylenediamine, dodecyldiethylenetriamine, diaminobenzene-dihydroiodide.

Quaternary ammonium compounds e.g. alkyl-dimethyl-benzyl-ammonium chloride, alkyldimethyl-ethylbenzyl-ammonium chloride, dodecyl-dimethyl-3,4-dichlorobenzylammonium chloride, dodecyl-di-(2-hydroxyethyl)-benzyl-ammonium chloride, dodecyl-di-(2-hydroethyl)-benzyl-ammonium pentachlorophenolate, dodecyl-di-(2-hydroxyethyl)-benzyl-ammonium-4-methylbenzoate, dodecyl-dimethyl-phenoxyethyl-ammonium bromide, 4-diisobutyl-phenoxyethoxyethyl-dimethyl-benzylammonium chloride, 4-diisobutyl-cresoxyethoxyethyl-dimethylbenzyl-ammonium chloride, dimethyl-didecyl-ammonium chloride, cetyl-trimethylammonium bromide, dodecylpyridinium chloride, cetylpyridinium chloride, dodecyl-isoquinolinium chloride, decamethylene-bis-4-aminoquinalidinium dichloride, α-(p-tolyl)-dodecyl-trimethyl-ammonium methosulphate, (dodecanoyl-N-methyl-aminoethyl)-(phenylcarbamoyl-methyl)-dimethylammonium chloride.

Quaternary phosphonium compounds e.g. dodecyl-triphenyl-phosphonium bromide.

Amphoteric compounds e.g. dodecyl-di-(aminoethyl)-glycin.

Heterocyclic compounds e.g. 2-mercaptopyridine-N-oxide, Na- and Zn-salt of 2-mercaptopyridine-N-oxide, 2,2'-dithiopyridine-1,1'-di-N-oxide, 8-hydroxyquinoline, 5-chloro-8-hydroxyquinoline, 5-chloro-7-iodo-8-hydroxyquinoline, 5,7-dichloro-8-hydroxyquinoline, 5,7-dichloro-8-hydroxyquinaldine, bis-2-methyl-4-amino-quinolyl-carbamidehydrochloride, 2-mercaptobenzthiazole, 2-(2'-hydroxy-3',5'-dichlorophenyl)-5-chlorobenzimidazole, 2-aminoacridinehydrochloride, 5,6-dichlorobenzoxazolone, 1-dodecyl-2-iminoimidazoline-hydrochloride, 6-chlorobenzisothiazolone.

The methods of application of the thiadiazole derivatives of formula I for the control of microorganisms, especially of bacteria and fungi, and for the protection of organic materials and objects against infestation by microorganisms, are very varied. The said thiadiazole derivatives can be worked directly into the material to be protected, e.g. into material having a synthetic resin base, such as polyamides and polyvinyl chloride, into paper-treatment liquors, into printing thickeners made from starch or from cellulose derivatives, into lacquers and paints containing, for example, casein, into spun rayon, into viscose spinning solutions, into paper, into animal mucus or oils, into permanent coatings based on polyvinyl alcohol, into cosmetic articles, and into ointments or powders. Furthermore, they can be added also to preparations of inorganic or organic pigments for the painting trade, and to softeners, etc.

By combination of the compounds according to the invention with interface-active, especially wash-active, substances, detergents and cleansing agents are obtained which have an excellent antibacterial or antimycotic action. Aqueous preparations of such detergents and cleansing agents containing compounds according to the invention are suitable as antimicrobial cleansing agents, especially in the foodstuff and drink industry, e.g. in breweries, dairies and abattoirs.

Moreover, the thiadiazole derivatives of formula I can be employed in the form of their organic solutions, e.g. as sprays, or as dry-cleaning agents, or for the impregnation of wood; suitable organic solvents for these applications are preferably non-water-miscible solvents, particularly petroleum fractions, but also water-miscible solvents such as lower alcohols, e.g. methanol or ethanol, or ethylene glycol monomethyl ether or —monoethyl ether, can be used. A number of the new compounds can be employed also in aqueous solution.

Furthermore, the compounds of formula I can be used, together with wetting or dispersing agents, in the form of their aqueous dispersions, e.g. for the protection of substances which have a tendency to rot, such as for the protection of leather, paper, etc..

Solutions or dispersions of active substances, which can be used for the protection of these materials, advantageously have a content of active substance of at least 0.005 g/litre, e.g. 0.01 to 5, preferably 0.1 to 3 g/litre.

The new thiadiazole derivatives can moreover be used with particular advantage for the production of antimicrobially finished plastics sheet material, e.g. made from polyvinyl chloride. Such sheet materials are valuable packing materials for goods which have to be protected against infestation by harmful microorganisms.

The compounds of formula I are also suitable for the control of such phytopathogenic fungi which damage seeds, and of the spores thereof; as well as for the protection of the seeds against fungi. The compounds according to the invention can therefore be used with success as seed dressing agents.

All types of seed can be treated according to the invention and effectively protected against fungi infestation; e.g., seeds of wheat, rye, barley, oats, maize, rice, cotton, sugar beet, vegetables, tubers such as potatoes, etc.. The dressing agents according to the invention render possible the control of practically all phytopathogenic fungi and their spores which damage seeds present in the soil, and which lead to serious parasitic plant diseases, particularly to the known blight and mould diseases. The following phytopathogenic fungi, amongst others, can be controlled with the dressing agents according to the invention:

| | |
|---|---|
| blight fungi | (e.g. *Tilletia tritici, Ustilago tritici, Ustilago undae, Ustilago avenea, Ustilago ceae*) |
| snow mould | (*Fusarium nivale*) |
| root fungi | (*Rhizoctonia solani*) |
| stem break diseases | (*Pythium species*) |

The treatment with the dressing agents embracing compounds of formula I suggested according to the invention can be carried out, in a manner known per se, by the wet or dry dressing treatment. In the case of the wet treatment, the seeds are sprinkled with or immersed in a solution or dispersion containing the dressing agent, and afterwards dried. The concentration of active substance in such a liquid dressing preparation is 0.01 – 4 percent by weight, preferably 0.1 to 1 percent by weight. In the dry dressing treatment, the seeds are dusted on the surface with the dressing agent used in a finely dispersed form. The employed amount of dressing agent should be such that, after treatment, the applied amount is 0.01 – 10 g, preferably 0.1 – 3.0 g, of active substance per 1 kg of seed. The dressing agents used according to the invention can contain, besides the liquid or solid carriers, emulsifiers, dispersing agents, auxiliaries and distributing agents, as well as agents for increasing adhesiveness, and surface active agents. Suitable liquid carriers can be aqueous systems, and also organic solvents or diluents. The agents used according to the invention contain as solid carriers finely dispersed or pulverulent, preferably inert materials, especially mineral or inorganic products. Naturally, the dressing agent preparations used according to the invention can contain, in appropriate concentrations, further active substances suitable for plant protection, such as, e.g. insecticides, nematocides, rodenticides, and agents protecting against damage caused by birds.

Furthermore, mention is made of the applicability of the new thiadiazole derivatives of formula I according to the invention as active substances for the therapy of diseased conditions of the skin, of the intestinal system and of the urinary passages of the warm-blooded animal, which follows from the excellent action against pathogenic bacteria and fungi and the relatively low toxicity.

The antimicrobial agents according to the invention contain at least one thiadiazole derivative of formula I as active substance. The nature of the carriers is governed considerably by the field of application. For external application, for example, for the disinfection of healthy skin as well as for the disinfection of wounds, and for the treatment of dermatosis and infections of the mucous membrane caused by bacteria or fungi, ointments, powders and tintures are particularly suitable. Foundations for ointments can be anhydrous; they can consist, for example, of mixtures of wool fat and vaseline; or they can be aqueous emulsions in which the active substance is suspended. Suitable carriers for powders are, e.g. starches such as rice starch, which, optionally, can be made specifically lighter, e.g. by the addition of highly-dispersed silica, or heavier by the addition of talcum.

Tinctures contain at least one thiadiazole derivative of formula I in aqueous, particularly 45–75%, ethanol, to which is optionally added 10–20% of glycerin. Also solutions are suitable, particularly for disinfection of healthy skin, the solutions being prepared with the aid of the usual solubility-promoting agents such as, e.g. polyethylene glycol, as well as with the aid of emulsifiers. The content of active substance in the aforementioned external preparations is preferably between 0.1 and 5%.

In all preparations, whether for technical, agricultural, cosmetic, hygienic or medicinal fields of application, the new thiadiazole derivatives of formula I can be present as the sole active substance, or combined with other known bactericidal and, in particular, fungicidal active substances, e.g. for the broadening of the sphere of action. They can be combined, for example, with halogenated salicylic acid alkylamides and —anilides, with halogenated diphenylureas, with halogenated benzoxazoles or benzoxazolones, with polychlorohydroxydiphenylmethanes, with halogenodihydroxydiphenylsulphides, with bactericidal 2-imino-imidazolidines or —tetrahydropyrimidines, or with bactericidal and fungicidal quaternary compounds, or with certain dithiocarbamic acid derivatives, such as with tetramethylthiuramdisulphide, with fungicidal amidines, and carbamoyloximes. It is also possible, optionally, to use carriers having favourable inherent effects, such as, for example, sulphur as a powder foundation, or zinc stearate as a constituent of ointment foundations.

Some typical preparations for various fields of application are described in the following examples:

Dust

The following substances are used for the preparation of a 2% dust:
2 parts of active substance of formula I,
5 parts of colloidal silica, and
93 parts of talcum.

The active substance is intimately mixed and ground with the carriers. The fungicidal dust obtained in this manner is used for the dusting of plants.

Wettable powder

The following substances are used for the preparation of (a) a 25% and (b) a 40% wettable powder:
a. 25 parts of active substance of formula I,
10 parts of a 1:1 mixture of $C_8$-$C_{18}$-alkanol-polyglycol ether and kieselguhr,
35 parts of kieselguhr, and
30 parts of colloidal silica;
b. 40 parts of active substance of formula I,
10 parts of a 2:3 mixture of $C_8$-$C_{18}$-alkylphenoxypolyoxyethylene glycol and silica, and
50 parts of silica.

The active substances are absorbed on to the carriers, and the whole subsequently mixed and ground with the stated additives. A wettable powder is obtained having excellent wetting and suspension properties. It is possible to obtain from such wettable powders, by dilution with water, suspensions of any desired concentration of active substance, the said suspensions being used for the treatment of cultivated plants.

Emulsion concentrate

The following substances are used for the preparation of (a) a 10% and (b) a 20% emulsion concentrate:
a. 10 parts of active substance of formula I,
15 parts of ethoxyethanol,
15 parts of dimethylformamide,
50 parts of mineral oil with a high content of aromatics,
and
10 parts of a combination-emulsifier consisting of the calcium salt of dodecylbenzenesulphonic acid and an alkylarylpolyglycol ether (e.g. "Emullat P 140 HFP," manufactured by Union Chimique S.A., Brussels);
b. 20 parts of active substance of formula I,
70 parts of xylene, and
10 parts of a combination-emulsifier consisting of the calcium salt of dodecylbenzenesulphonic acid and an alkylarylpolyglycol ether (e.g. "Emullat P 140 HFP," manufactured by Union Chimique S.A., Brussels).

The active substances are dissolved in xylene or in the solvent mixture, and the combination-emulsifiers are then added to these solutions. Emulsion concentrates are obtained which can be diluted with water to obtain emulsions of any desired concentration. Such emulsions are suitable for the treatment of cultivated plants.

Seed dressing agent

A. A dry dressing agent of the following composition was employed:
20 percent by weight of 3-(p-chlorophenylthio)-5-methyl sulphonyl-1,2,4-thiadiazole,
1 percent by weight of paraffin oil, and
79 percent by weight of talcum.

An amount of 600 g of this agent, which possesses good adhesiveness on seed grains, is placed together with 100 kg of barley seed into a tightly sealing rotary drum. The filled drum is rotated for 45 minutes, after which time practically the whole amount of the employed agent is located as a coating on the grains of the seed.

B. A wet dressing agent of the following composition was employed:
23.00 percent by weight of 3-(p-chlorophenylthio)-5-methylsulphonyl-1,2,4-thiadiazole,
1.65 percent by weight of alkarylpolyglycol ether (emulsifer)
1.65 percent by weight of $NaHSO_4 \cdot H_2O$, finely ground,
73.70 percent by weight of diethylene glycol monoethylether-acetate.

A bath is prepared consisting of 250 g of the above agent and 15 litres of water at room temperature, the bath preparation being thoroughly mixed. This aqueous preparation is poured over 100 kg of rye seed. The seed is then allowed to drain on a sieve, and subsequently well dried.

C. A wet dressing agent of the following composition was employed:
65.0 percent by weight of a compound of formula I,
18.0 percent by weight of precipitated, hydrated, amorphous silica,
5.0 percent by weight of coconut oil fatty alcohol polyglycol ether having 8 moles of ethylene oxide per mole of fatty alcohol,
4.0 percent by weight of adhesive (containing 50% of polyvinyl alcohol),
8.0 percent by weight of kaolin (finely powdered).

An amount of 50 g of this agent is dispersed with 3.5 litres of water. This aqueous suspension is used to spray 100 kg of oat seed, the seed being thoroughly worked through, so that the whole amount of liquid is taken up by the grains of seed. The just slightly moist seed is subsequently dried.

I claim:
1. Thiadiazole derivative which corresponds to the formula

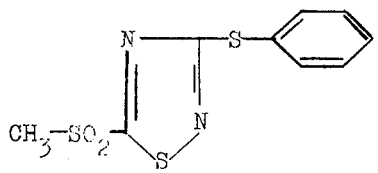

2. Thiadiazole derivative according to claim 1, which corresponds to the formula

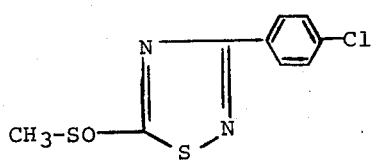
3. Thiadiazole derivative which corresponds to the formula
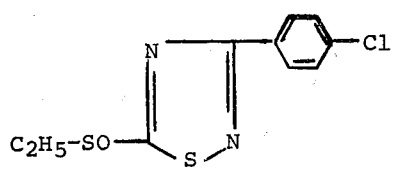
* * * * *

UNITED STATES PATENT AND TRADEMARK OFFICE
CERTIFICATE OF CORRECTION

PATENT NO. : 3,917,630
DATED : November 4, 1975
INVENTOR(S) : Heinz Hambock et al.

It is certified that error appears in the above-identified patent and that said Letters Patent are hereby corrected as shown below:

Column 14, Claim 2, line 66, delete "according to claim 1".

*Signed and Sealed this*

*sixth* Day of *April 1976*

[SEAL]

Attest:

RUTH C. MASON
*Attesting Officer*

C. MARSHALL DANN
*Commissioner of Patents and Trademarks*